United States Patent [19] [11] 3,929,860
Drake [45] Dec. 30, 1975

[54] SULFOLANE OR AQUEOUS SULFOLANE AS DILUENT FOR PREPARATION OF UNSATURATED NITRILES FROM LOWER UNSATURATED NITRILES AND OLEFINS

[75] Inventor: Charles A. Drake, Nowata, Okla.

[73] Assignee: Phillips Petroleum Company, Bartlesville, Okla.

[22] Filed: Oct. 29, 1974

[21] Appl. No.: 518,748

[52] U.S. Cl............ 260/465.9; 260/464; 260/465 C; 260/465 K; 260/465.3
[51] Int. Cl.² ............... C07C 120/00; C07C 121/30; C07C 121/148; C07C 121/70
[58] Field of Search............ 260/465.9, 464, 465 K, 260/465 C, 465.3

[56] References Cited
UNITED STATES PATENTS
2,641,607  6/1953  Albisetti, Jr. et al. ............ 260/465.3
3,840,583  10/1974  Turk et al. ........................ 260/465.9

*Primary Examiner*—Joseph P. Brust

[57] ABSTRACT

An olefinically unsaturated nitrile is reacted with an olefinic hydrocarbon containing an allylic hydrogen in the present of at least one diluent selected from the group consisting of sulfolane compounds and mixtures of water and at least one sulfolane compound.

28 Claims, No Drawings

SULFOLANE OR AQUEOUS SULFOLANE AS DILUENT FOR PREPARATION OF UNSATURATED NITRILES FROM LOWER UNSATURATED NITRILES AND OLEFINS

This invention relates to the reaction of an olefinically unsaturated nitrile and an olefinic hydrocarbon to yield olefinically unsaturated nitrile products having a greater number of carbon atoms than the unsaturated nitrile reactant.

Various methods of preparing high carbon number unsaturated nitrile reaction products are well known in the art. Representative methods include the reaction of unsaturated organic halides with metal cyanides, the reaction of unsaturated carbocyclic compounds with acrylonitrile in the presence of an alkaline catalyst, as well as the reaction of low carbon number unsaturated nitriles with olefins. In general, the methods of the art to date have not been completely satisfactory for various reasons. In some cases starting materials have been difficult to obtain, in other cases only certain nitriles are obtained because of the arrangement of carbon atoms in the carbocyclic nuclei, and in other cases the yields of the desired high carbon number unsaturated nitrile reaction products are often too low to be commercially attractive or advantageous.

It is an object of this invention to provide an improved process for the reaction of an olefinic hydrocarbon with an olefinically unsaturated nitrile in order to obtain an olefinically unsaturated nitrile reaction product having a greater number of carbon atoms than the original nitrile. Another object is to provide an improved process employing specific operating conditions which results in increased yields of high carbon number olefinically unsaturated nitrile reaction products. Another object of the invention is to increase the percentage conversion of the reactants. A further object of the invention is to increase the selectivity of the reaction for the desired products. Yet another object of the invention is to increase the ratio of the desired products to undesired heavy by-products. Other objects, aspects and advantages of the invention will be apparent from a study of the specification and the appended claims to the invention.

It has been found that these objectives can be achieved by conducting the reaction of the olefinically unsaturated nitrile and the olefin in the presence of a diluent comprising at least one sulfolane compound, and preferably also comprising water.

Any unsaturated nitrile can be employed in the practice of this invention provided the nitrile contains ethylenic unsaturation, contains at least one hydrogen atom attached to a doubly bonded carbon atom, and contains at least one cyano group attached to a carbon atom adjacent and doubly bonded to a carbon atom containing at least one hydrogen atom. Illustrative unsaturated nitrile reactants are those represented by the formula

RCH = CR — CN

wherein each R is independently selected from the group consisting of hydrogen, alkyl, cycloalkyl, and aryl hydrocarbyl radicals or combinations thereof, such as alkylcycloalkyl, cycloalkylalky, aralkyl and arylcycloalkyl radicals. Preferably the total number of carbon atoms in the nitrile reactant is within the range of from 3 to 18, more preferably from 3 to 8. Examples of unsaturated nitriles meeting the requirements of the above formula are acrylonitrile, 2-butenenitrile, 2-hexenenitrile, 5-methyl-2-hexenenitrile, 4-methyl-2-heptenenitrile, 6,6,8,8-tetramethyl-2-nonenenitrile, 6-cyclohexyl-2-octenenitrile, 6-phenyl-2-decenenitrile, 2-octadecenenitrile, 6,7,8-trimethyl-9-phenyl-2-nonenenitrile, 5-p-tolyl-2-nonenenitrile, and the like, and mixtures thereof.

Any olefinic hydrocarbon compound can be employed in the practice of this invention, provided that the compound has at least one olefinic linkage having joined to one of the doubly bonded carbons a carbon atom containing at least one hydrogen atom attached thereto. The olefinic hydrocarbons preferably have from 3 to 12 carbon atoms per molecule with from 1 to 2 ethylenically unsaturated nonconjugated double bonds as the sole aliphatic unsaturation. The preferred types of these compounds are the open chain monoolefinic hydrocarbons represented by the formula $R'_2C = CR' — CHR'_2$, wherein each $R'$ is independently selected from the group consisting of hydrogen, alkyl, cycloalkyl, and aryl hydrocarbyl radicals and combinations thereof. Especially preferred are those monoolefinic hydrocarbons having 3 to 12 carbon atoms and having an alkyl group, preferably methyl, as a side chain attached to at least one of the carbon atoms comprising the ethylenic linkage. Specific examples of unsaturated compounds of this type which are used in the process of this invention include propylene, isobutylene, diisobutylene, triisobutylene, beta-pinene, 2-butene, biallyl, bimethallyl, alphamethylstyrene, 1-pentene, 1-decene, cyclohexene, allylbenzene, 3,4,4-trimethyl-2-pentene, 2,3-dimethyl-2-butene, and 2-methyl-1-phenyl-2-propene.

In the process of the present invention it is believed that the olefinic hydrocarbon compound and the unsaturated nitrile react in accordance with the "ene" reaction to produce, as the principal product, a compound having the structural formula

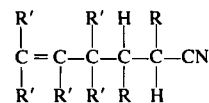

Generally, a lesser amount of an isomeric product having the formula

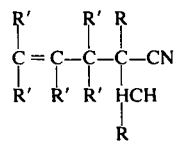

is also produced. Thus, isobutylene and acrylonitrile react to produce 5-methyl-5-hexenenitrile as the principal product along with a small amount of 2,4-dimethyl-4-pentenenitrile. It can be readily seen that isobutylene as the olefinic hydrocarbon reactant possesses six of the required allylic hydrogens but that all six are structurally equivalent so that only two compounds corresponding to the above general formulas are produced according to the "ene" reaction.

However, it will also be evident that if a compound having two or more allylic hydrogens which are not structurally equivalent is employed as the olefinic hydrocarbon reactant, the number of expected isomeric product compounds having the above general formulas will be increased. For example, if 2,4,4-trimethyl-1-pentene is reacted with the acrylonitrile the major products expected according to the "ene" reaction would be 5-methylene-7,7-dimethyloctanenitrile and 4-methylene-2,6,6-trimethylheptanenitrile with lesser amounts of 5,7,7-trimethyl-5-octenenitrile and 4-t-butyl-5-methyl-5-hexenenitrile. Other factors not fully understood at present may influence the relative amounts of the possible isomers in the product and in other instances presently employed analytical methods may not distinguish the various isomers present. Indeed, the products find utility in many applications with no need of a costly separation of the isomers present in the product.

The molar ratio of reactants can vary. It is convenient to use olefin:nitrile molar ratios within the range of about 2:1 to about 10:1, preferably within the range of 4:1 to 6:1.

Residence time in the reactor is dependent upon the reaction conditions and the desired degree of reaction and generally varies from several minutes to twelve hours or more. Preferably reaction times vary from about thirty minutes to six hours.

Any suitable reaction temperature can be employed in the practice of this invention. Reaction temperatures within the range of from about 100° C to 400° C are generally acceptable. Preferred reaction temperatures fall within the range of about 200° C to about 300° C.

Any suitable reaction pressure can be employed and can vary over a wide range. In general, the reaction pressures will be within the range of from about atmospheric to about 100,000 psig, preferably from about 1,000 to about 4,000 psig. Autogenous pressures are satisfactory although the pressure of an inert gas can be added to maintain a liquid phase.

If desired, the processes of this invention can be carried out in the presence of a polymerization inhibitor. The use of the inhibitor often advantageously limits side reactions such as the dimerization or polymerization of the olefinically unsaturated nitrile. When an inhibitor is employed, it is generally desirable that an amount of from about 0.001 to about 5, preferably from about 0.1 to about 1, percent by weight inhibitor based on the weight of unsaturated nitrile reactant be employed. Suitable inhibitors include hydroquinone, 2,6-di-tert-butylpara-cresol, 2,6-di-tert-butylhydroquinone, 4-tert-butylcatechol, para-hydroxydiphenylamine, and the like, and combinations thereof.

The reaction of the above-described olefins and nitriles is advantageously carried out in the presence of a diluent comprising at least one sulfolane compound and from zero to about 50 weight percent water, based on the total weight of the diluent. A diluent system consisting of from about 1 to about 45 weight percent water with the balance being at least one sulfolane compound is presently preferred, and a more preferred diluent system consists essentially of from about 5 to about 40 weight percent water with the balance being sulfolane.

The term "sulfolane compound" as employed herein and in the appended claims refers to a saturated sulfolene compound which may be either unsubstituted or substituted. In other words, the sulfolane compound contains or consists or a saturated five-membered ring of four carbon atoms and a sulfur atom, the latter having two oxygen atoms directly attached thereto. The generic structural formula of sulfolane compounds, therefore, is

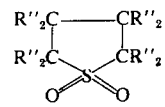

wherein the R″ groups are independently selected from the group consisting of hydrogen, organic radicals and inorganic radicals. In the simple unsubstituted sulfolane, also known as 2,3,4,5-tetrahydrothiophene-1,1-dioxide, each R″ is hydrogen. Thus, the generic term "a sulfolane" or "a sulfolane compound" covers not only the compound sulfolane, but also the substituted derivatives thereof, particularly those in which various organic and/or inorganic and particularly hydrocarbon radicals, i.e., alkyl, alkenyl, aryl, aralkyl, alkaryl, alicyclic and/or heterocyclic radicals, and/or inorganic radicals are substituted for one or more of the hydrogen atoms of the sulfolane. In general the sulfolane compound molecule will contain a total of from 4 to 12 carbon atoms. Representative examples of the sulfolane compounds include 2,3,4,5-tetrahydrothiophene 1,1-dioxide (known generally as sulfolane), tetrahydro-2-methylthiophene 1,1-dioxide, tetrahydro-2,2,4-trimethylthiophene 1,1-dioxide, tetrahydro-2-octylthiophene 1,1-dioxide and tetrahydro-2-phenylthiophene 1,1-dioxide, and mixtures thereof.

The diluent will generally be employed in an amount in the range of about 0.5:1 to about 40:1 parts by weight of diluent per part by weight of reactant nitrile compound. The amount of diluent currently preferred is in the range 1:1 to 20:1 parts of weight of diluent per part by weight of reactant nitrile compound. The advantages of this diluent system include improved selectivity to the desired olefinically unsaturated nitrile and reduced amounts of heavy polymeric by-product. This latter by-product is particularly objectionable because it tends to foul reactor surfaces.

A convenient method of carrying out this invention comprises heating a mixture of a 2-alkenenitrile, e.g., acrylonitrile, and an olefinic hydrocarbon compound, e.g., isobutylene, present in a mole ratio of about 1 to 5, respectively, in a reaction pressure vessel at a temperature within the range of 200° to 300° C and at pressure of from 1,000 to 4,000 psig. Thereafter, the resulting olefinically unsaturated nitrile reaction product is readily isolated from the reaction mixture by any convenient product recovery method, such as fractional distillation. The reaction of olefinic hydrocarbons and unsaturated nitriles can be promoted indefinitely, in apparatus well known to the art and suited to either batch or continuous reaction conditions, until one or both of the reactants, i.e., the nitrile and/or the olefinic hydrocarbon constituent, are depleted from the reaction media.

If desired, the reaction can be carried out in the presence of any suitable promoter, for example an organo derivative of a Group VA element defined by the following formula R‴$_n$ZH$_{3-n}$ wherein each R‴ is independently selected from the group consisting of aryl, alkaryl, cycloalkylaryl, araryl, aryloxy, alkaryloxy, arylaryloxy; wherein each R‴ group contains from 6 to 12 carbon atoms; Z is selected from the group consisting of

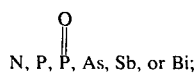

and n is 2 or 3. Illustrative of organo derivatives of the Group VA elements defined by the above formula are the following compounds: triphenylphosphine, diphenylphosphine, tris-(hexylphenyl)phosphine, tris(cyclohexylphenyl)phosphine, dinaphthylphosphine, tris(4-biphenyl)phosphine, tris(4-butylphenyl)phosified). Following cooling and venting the reactor, a dark liquid product mixture was obtained. Removal of the aqueous phase and fractional distillation of the organic phase gave a major amount of a monoadduct (MA) of isobutylene and acrylonitrile, consisting of 5-methyl-5-hexenenitrile and 2,4-dimethyl-4-pentenenitrile, and a lesser amount of an undistillable residue (termed "heavies" and presumed to be a mixture of polyamines). Other operating values and results are recorded in Table I.

TABLE I

| Run No. | ACN[a] gm | IB[b] gm | Sulf.[c] gm | H$_2$O, gm | Time, Hour | Temp., °C | Conv.[d] % | Select. to MA, wt. % | MA/H[e] |
|---|---|---|---|---|---|---|---|---|---|
| 1 | 80 | 345 | — | 20 | 2 | 270 | 68 | 56 | 4.5 |
| 2 | 60 | 240 | — | 20 | 0.75 | 300 | 64 | 58 | 4.0 |
| 3 | 70 | 330 | 200 | — | 2 | 270 | 79 | 72 | 5.8 |
| 4 | 80 | 345 | 99 | — | 2 | 270 | 79 | 69 | 4.7 |
| 5[f] | 79 | 345 | 100 | 20 | 2 | 270 | 72 | 77 | 15.0 |
| 6[f] | 80 | 345 | 100 | 20 | 2 | 270 | 70 | 80 | 13.1 |
| 7[f] | 80 | 345 | 100 | 20 | 1.5 | 270 | 64 | 79 | 15.1 |
| 8[g] | 80 | 345 | 99 | 20 | 2 | 270 | 71 | 74 | 14.4 |
| 9[h] | 80 | 345 | 100 | 20 | 2 | 270 | 73 | 78 | 18.5 |
| 10[i] | 80 | 345 | 99 | 19 | 2 | 270 | 72 | 76 | 13.1 |
| 11[j] | 80 | 340 | 100 | 20 | 1.5 | 270 | 72 | 75 | 14.8 |
| 12 | 80 | 345 | 100 | 20 | 2 | 270 | 71 | 77 | 16.2 |
| 13 | 80 | 350 | 100 | 20 | 2 | 260 | 61 | 79 | 17.8 |
| 14[i] | 80 | 340 | 99 | 10 | 1.5 | 270 | 69 | 77 | 12.4 |
| 15 | 80 | 345 | 99 | 10 | 2 | 270 | 75 | 74 | 6.5[j] |
| 16[f] | 80 | 360 | 99 | 10 | 2 | 260 | 66 | 71 | 15.4 |
| 17[f] | 80 | 340 | 80 | 40 | 1.5 | 270 | 73 | 78 | 18.5 |

[a]Acrylonitrile.
[b]Isobutylene.
[c]Sulfolane (i.e. 2,3,4,5-tetrahydrothiophene-1,1-dioxide).
[d]Conversion of acrylonitrile.
[e]Weight ratio of monoadduct to heavies.
[f]Run in presence of 0.5 gm β-Ionol.
[g]Run in presence of 0.5 gm hydroquinone.
[h]Run in presence of 3 drops glacial acetic acid.
[i]Run in presence of 4 drops 5-methyl-1,9-nonanediamine.
[j]Reason for anomolous low MA/H value is not known.

phine, triphenylamine, diphenylamine, tris(3,5-dipropylphenyl)amine, triphenylarsine, tris(pentylphenyl)arsine, triphenylbismuthine, diphenylarsine, 4-diphenylphosphinobiphenyl, tris(p-tolyl)stibine, tris(3,5-dimethylphenyl)bismuthine, diphenyl(4-ethylphenyl)phosphine, diphenoxy(phenyl)phosphine, diphenyl(p-methylphenoxy)-phosphine, triphenylphosphite, diphenyl(p-tolyl)phosphine, triphenylphosphate, and the like, and mixtures thereof. The variant designated by n in mixtures of promoters represented by the formula R'''$_n$ZH$_{3-n}$ can vary, with the arithmetical sum of the value of n of individual promoters, from 2 to 3. The term "reaction promoting material" includes materials commonly called catalysts as well as materials commonly called promoters.

The amount of promoter that can be employed in accordance with this invention can vary widely. In general, the mole ratio of promoter to unsaturated nitrile reactant can vary from about 1 to 20 to about 1 to 1. Preferably, mole ratios of promoter to unsaturated nitrile reactant of from about 1 to 10 to about 1 to 3 are employed.

The following example is presented in further illustration of the invention but should not be unduly construed in limitation thereof.

EXAMPLE

In each of a series of runs, a 1-liter reactor was charged with acrylonitrile and the diluent. After the system was flushed with nitrogen, isobutylene was added. The system was then heated at 270° C for two hours (unless time and temperature are otherwise spec- Runs 1 and 2 illustrate that the use of water as a diluent in the reaction of isobutylene with acrylonitrile resulted in fair selectivity to the desired monoadduct and an appreciable amount of heavies.

Runs 3 and 4 illustrate that sulfolane as diluent in the reaction of isobutylene with acrylonitrile resulted in higher conversion of acrylonitrile, higher selectivity to monoadduct and slighly improved monoadduct/-heavies ratio compared to water as diluent.

Runs 5 to 17 illustrate that the use of aqueous sulfolane as diluent in the reaction of acrylonitrile with isobutylene resulted in slightly lower conversion but higher selectivity to desired product than obtained using sulfolane alone (runs 3 and 4). Surprisingly, the ratio of monoadduct to heavies showed approximately a three-fold improvement through the use of aqueous sulfolane compared to sulfolane or water alone. These data further show that neither varying the composition of the diluent from 9 percent to 33 percent by weight water nor using various additives in trace amounts had significant effect on the reaction. Slight reductions of reaction time or temperature reduced conversion slightly but had little effect on selectivity of MA/H ratio.

In each of the 17 runs there was observed a small amount (less than 10 percent selectivity) of a mixture consisting of 80% 5-methylene-1,9-nonanedinitrile and 20% 2,4-dimethyl-4-octenedinitrile.

The unsaturated nitriles prepared according to this invention, such as 5-methyl-5-hexenenitrile, are useful as chemical intermediates and solvents for the preparation of unsaturated dinitriles, such as 5-methylene-1,9- nonanedinitrile, which are, in turn, useful in the preparation of monomers for a new family of polyamides, polyureas, poly(amide-ureas), etc.

Reasonable variations and modifications are possible within the scope of the foregoing disclosure and the appended claims to the invention.

That which is claimed is:

1. In a method wherein at least one olefinic hydrocarbon compound is reacted with at least one olefinically unsaturated nitrile reactant in the presence of a diluent under suitable reaction conditions to produce, as the principal product, at least one olefinically unsaturated nitrile product having a greater number of carbon atoms than said unsaturated nitrile reactant;
   said at least one unsaturated nitrile reactant having the formula RCH=CR—CN, wherein each R is independently selected from the group consisting of hydrogen, alkyl, cycloalkyl, and aryl hydrocarbyl radicals and combinations thereof;
   said at least one olefinic hydrocarbon compound having the formula $R'_2C=CR'$—$CHR'_2$, wherein each R' is independently selected from the group consisting of hydrogen, alkyl, cycloalkyl, and aryl hydrocarbyl radicals and combinations thereof;
   the improvement comprising conducting the reaction of said at least one olefinic hydrocarbon and said at least one olefinically unsaturated nitrile reactant in the presence of a diluent comprising at least one sulfolane compound and from zero to about 50 weight percent water, based on the total weight of said diluent; and wherein the amount of the total of said water, if present, and said at least one sulfolane compound is in the range of about 0.5 to about 40 parts by weight per part by weight of said at least one olefinically unsaturated nitrile reactant.

2. A process in accordance with claim 1 wherein said at least one olefinic hydrocarbon compound has from 3 to 12 carbon atoms, and wherein said at least one olefinically unsaturated nitrile reactant has from 3 to 18 carbon atoms.

3. A process in accordance with claim 2 wherein said reaction conditions comprise a temperature in the range of about 200°C to about 300°C, a pressure in the range of about 1000 to about 4000 psig, a contact time in the range of about 30 minutes to about 6 hours, a mole ratio of said olefinic hydrocarbon compound to said olefinically unsaturated nitrile reactant in the range of about 4:1 to about 6:1.

4. A process in accordance with claim 2 wherein said reaction conditions comprise a temperature in the range of about 100°C to about 400°C, a pressure in the range of about atmospheric to about 100,000 psig, a contact time in the range of about several minutes to about 12 hours, a mole ratio of said olefinic hydrocarbon compound to said olefinically unsaturated nitrile reactant in the range of about 2:1 to about 10:1; and wherein said at least one olefinically unsaturated nitrile product comprises compounds having the structural formula

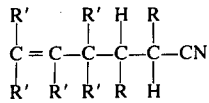 and 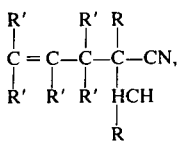

wherein R and R' are defined above.

5. A process in accordance with claim 4 wherein said diluent consists essentially of sulfolane.

6. A process in accordance with claim 4 wherein said diluent consists essentially of a mixture of sulfolane and from about 1 to about 45 weight percent water.

7. A process in accordance with claim 4 wherein said diluent consists essentially of a mixture of sulfolane and from about 5 to about 40 weight percent water.

8. A process in accordance with claim 4 wherein the amount of the total of the water, if present, and said at least one sulfolane compound is in the range of about 1 to about 20 parts by weight per part by weight of said at least one olefinically unsaturated nitrile reactant.

9. A process in accordance with claim 1 wherein said diluent consists essentially of said at least one sulfolane compound and from 0 to about 50 weight percent water.

10. A process in accordance with claim 1 wherein said diluent consists essentially of said at least one sulfolane compound.

11. A process in accordance with claim 1 wherein said diluent consists essentially of said at least one sulfolane compound and from about 1 to about 45 weight percent water.

12. A process in accordance with claim 1 wherein said diluent consists essentially of a mixture of sulfolane and from about 1 to about 45 weight percent water.

13. A process in accordance with claim 1 wherein said diluent consists essentially of a mixture of sulfolane and from about 5 to about 40 weight percent water.

14. A process in accordance with claim 1 wherein said diluent consists essentially of sulfolane.

15. In a method wherein at least one olefinic hydrocarbon compound is reacted with at least one olefinically unsaturated nitrile reactant in the presence of a diluent under suitable reaction conditions to produce, as the principal product, at least one olefinically unsaturated nitrile product having a greater number of carbon atoms than said unsaturated nitrile reactant;
   said at least one unsaturated nitrile reactant having the formula RCH=CR—CN, wherein each R' is independently selected from the group consisting of hydrogen, alkyl, cycloalkyl, and aryl hydrocarbyl radicals and combinations thereof;
   said at least one olefinic hydrocarbon compound having the formula $R'_2C=CR'$—$CHR'_2$, wherein each R is independently selected from the group consisting of hydrogen, alkyl, cycloalkyl, and aryl hydrocarbyl radicals and combinations thereof;
   the improvement comprising conducting the reaction of said at least one olefinic hydrocarbon and said at least one olefinically unsaturated nitrile reactant in the presence of a diluent consisting essentially of at least one sulfolane compound and from zero to about 50 weight percent water, based on the total weight of said diluent.

16. A process in accordance with claim 15 wherein said at least one olefinic hydrocarbon compound has from 3 to 12 carbon atoms, and wherein said at least one olefinically unsaturated nitrile reactant has from 3 to 18 carbon atoms.

17. A process in accordance with claim 16 wherein said reaction conditions comprise a temperature in the range of about 200°C to about 300°C, a pressure in the range of about 1000 to about 4000 psig, a contact time in the range of about 30 minutes to about 6 hours, a mole ratio of said olefinic hydrocarbon compound to said olefinically unsaturated nitrile reactant in the range of about 4:1 to about 6:1.

18. A process in accordance with claim 16 wherein said reaction conditions comprise a temperature in the range of about 100°C to about 400°C, a pressure in the range of about atmospheric to about 100,000 psig, a contact time in the range of about several minutes to about 12 hours, a mole ratio of said olefinic hydrocarbon compound to said olefinically unsaturated nitrile reactant in the range of about 12:1 to about 10:1; and wherein said at least one olefinically unsaturated nitrile product comprises compounds having the structural formula

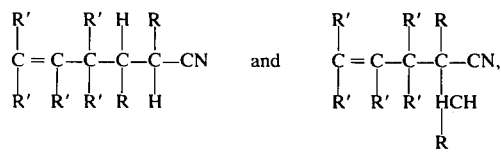

wherein R and R' are as defined above.

19. A process in accordance with claim 18 wherein said diluent consists essentially of sulfolane.

20. A process in accordance with claim 18 wherein said diluent consists essentially of a mixture of sulfolane and from about 1 to about 45 weight percent water.

21. A process in accordance with claim 18 wherein said diluent consists essentially of a mixture of sulfolane and from about 5 to about 40 weight percent water.

22. A process in accordance with claim 18 wherein said diluent consists essentially of said at least one sulfolane compound and from about 1 to about 45 weight percent water.

23. A process in accordance with claim 18 wherein said diluent consists essentially of said at least one sulfolane compound and from about 5 to about 40 weight percent water.

24. A process in accordance with claim 18 wherein said diluent consists essentially of said at least one sulfolane compound.

25. A process in accordance with claim 15 wherein said diluent consists essentially of sulfolane.

26. A process in accordance with claim 15 wherein said diluent consists essentially of a mixture of sulfolane and from about 1 to about 45 weight percent water.

27. A process in accordance with claim 26 wherein said olefinic hydrocarbon compound is isobutylene, said unsaturated nitrile reactant is acrylonitrile, and the resulting reaction products comprise 5-methyl-5-hexenenitrile.

28. A process in accordance with claim 15 wherein said olefinic hydrocarbon compound is isobutylene, said unsaturated nitrile reactant is acrylonitrile, and the resulting reaction products comprise 5-methyl-5-hexenenitrile.

* * * * *

UNITED STATES PATENT AND TRADEMARK OFFICE
CERTIFICATE OF CORRECTION

PATENT NO. : 3,929,860
DATED : December 30, 1975
INVENTOR(S) : Charles A. Drake

It is certified that error appears in the above-identified patent and that said Letters Patent are hereby corrected as shown below:

Column 7, after line 60, delete $$\text{" and } C = \underset{R'}{\overset{R'}{C}} - \underset{R'}{\overset{R'}{C}} - \underset{R'}{\overset{R}{C}} - \underset{\underset{R}{HCH}}{C} - CN, \text{ "}$$

and insert $$-- \text{ and } C = \underset{R'}{\overset{R'}{C}} - \underset{R'}{\overset{R'}{C}} - \underset{R'}{\overset{R}{C}} - \underset{\underset{R}{HCH}}{C} - CN, --.$$

Column 8, line 44, delete "R' " and insert -- R --.
Column 8, line 50, delete "R" and insert -- R' --.
Column 9, line 12, delete "12:1" and insert -- 2:1 --.

Column 9, after line 15, delete $$\text{" and } C = \underset{R'}{\overset{R'}{C}} - \underset{R'}{\overset{R'}{C}} - \underset{R'}{\overset{R}{C}} - \underset{\underset{R}{HCH}}{C} - CN, \text{ "}$$

and insert $$-- \text{ and } C = \underset{R'}{\overset{R'}{C}} - \underset{R'}{\overset{R'}{C}} - \underset{R'}{\overset{R}{C}} - \underset{\underset{R}{HCH}}{C} - CN, --.$$

Signed and Sealed this sixth Day of April 1976

[SEAL]

Attest:

RUTH C. MASON
*Attesting Officer*

C. MARSHALL DANN
*Commissioner of Patents and Trademarks*